United States Patent
Wright et al.

(10) Patent No.: US 6,816,976 B2
(45) Date of Patent: Nov. 9, 2004

(54) SYSTEM AND METHOD FOR REDUCING POWER CONSUMPTION IN A UNIVERSAL SERIAL BUS DEVICE

(75) Inventors: David G. Wright, Woodinville, WA (US); Timothy J. Williams, Bellevue, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 615 days.

(21) Appl. No.: 09/821,006

(22) Filed: Mar. 29, 2001

(65) Prior Publication Data

US 2002/0144165 A1 Oct. 3, 2002

(51) Int. Cl.[7] .................................................. G06F 1/32
(52) U.S. Cl. ........................ 713/323; 713/322; 713/324
(58) Field of Search ................................. 713/300, 310, 713/320, 322, 323, 324; 709/223, 224; 370/392, 471

(56) References Cited

U.S. PATENT DOCUMENTS

| 6,049,885 | A | * | 4/2000 | Gibson et al. | 713/324 |
|---|---|---|---|---|---|
| 6,085,325 | A | * | 7/2000 | Jackson et al. | 713/300 |
| 6,085,328 | A | * | 7/2000 | Klein et al. | 713/310 |
| 6,226,291 | B1 | * | 5/2001 | Chauvel et al. | 370/392 |
| 6,272,644 | B1 | * | 8/2001 | Urade et al. | 713/320 |
| 6,513,128 | B1 | * | 1/2003 | Wang et al. | 713/600 |
| 6,622,251 | B1 | * | 9/2003 | Lindskog et al. | 713/300 |

* cited by examiner

Primary Examiner—Lynne H. Browne
Assistant Examiner—Thuan Du
(74) Attorney, Agent, or Firm—Christopher P. Maiorana, P.C.

(57) ABSTRACT

The present invention concerns a method for reducing power consumption in a device, comprising the steps of (A) receiving one or more packets, (B) determining a type of each of the one or more packets and (C) suspending, waking, or partially waking the device in response to a particular type of packet.

22 Claims, 5 Drawing Sheets

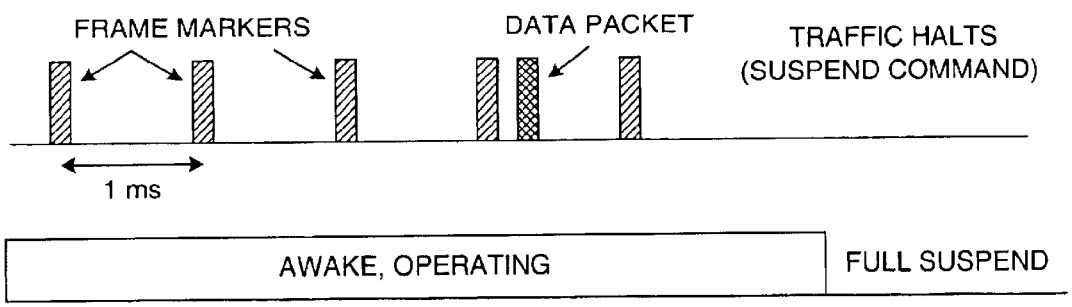
FIG. 1
(CONVENTIONAL)

US 6,816,976 B2

SYSTEM AND METHOD FOR REDUCING POWER CONSUMPTION IN A UNIVERSAL SERIAL BUS DEVICE

FIELD OF THE INVENTION

The present invention relates to a method and/or architecture for universal serial bus (USE) devices generally and, more particularly, to a method and/or architecture for reducing power consumption in USB devices.

BACKGROUND OF THE INVENTION

When implementing modern computer devices, in particular peripheral devices, it is generally desirable to provide low power consumption in the devices. Achieving a low power consumption during normal operating modes is typically a function of hardware. For example, through software control, specific hardware components of a particular device may be selected to be turned off to lower power consumption in suspend or sleep modes. However, it is often difficult to reach aggressive low power targets.

USB devices (which typically have current consumption of 10–100 mA) implement a low power suspend mode in which device current drops to 0–0.5 mA. The suspend mode is normally only entered on a system command (i.e., a suspend indication signal). Additionally, extensive use of the suspend mode can cause the USB device to miss USB traffic.

Referring to FIG. 1, an example illustrating a USB microcontroller continuously operating (i.e., on) during normal operation, since USB traffic is constantly received (i.e., traffic is received on each frame at 1 ms intervals). The microcontroller remains on, with clocks running, in order to immediately respond to any received USD traffic. Thus, conventional USB microcontrollers are either off (i.e., for a low-power state as directed by a host) or completely on during normal operation. The disadvantage of such an architecture is that full power consumption is required at all times during normal operation. In power sensitive applications, such as battery powered devices, meeting power consumption targets is a difficult challenge for USB devices.

SUMMARY OF THE INVENTION

The present invention concerns a method for reducing power consumption in a device, comprising the steps of (A) receiving one or more packets, (B) determining a type of each of the one or more packets and (C) suspending, waking, or partially waking the device in response to a particular type of packet.

The objects, features and advantages of the present invention include providing a method and/or architecture for reducing power consumption in USB devices that may (i) remain in suspend mode until the beginning of a USB packet, (ii) receive synchronization fields partly asynchronously (with no clock available) and partly synchronously (with a stable clock) to verify a valid packet has been received, and/or (iii) provide a mechanism for remaining in suspend during low-speed USB keep alive markers, while waking for data packets or bus reset events.

BRIEF DESCRIPTION OF THE DRAWINGS

These and other objects, features and advantages of the present invention will be apparent from the following detailed description and the appended claims and drawings in which:

FIG. 1 is a timing diagram illustrating conventional suspend operations;

DETAILED DESCRIPTION OF THE PREFERRED EMBODIMENTS

Figure 2:
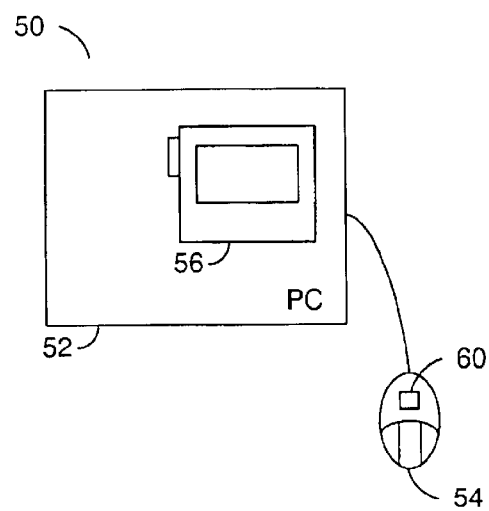
FIG. 2 is a block diagram illustrating an implementation of the present invention.

Referring to FIG. 2, a block diagram of a system 50 is shown in accordance with a preferred embodiment of the present invention. The system 50 generally comprises a computer (e.g., a personal computer (PC)) 52 and a peripheral device 54. In one example, the peripheral device 54 may be implemented as a Universal Serial Bus (USB) peripheral device. The system 50 may provide a low power mode of operation. The computer 52 may include an interface 56. In one example, the interface 56 may be implemented as a USB interface. The peripheral device 54 may include a microprocessor block (or circuit) 60. In one example, the circuit 60 may be implemented as a low power consumption microprocessor circuit. The circuit 60 may interface with the host device 52 (via the interface 56).

The system 50 may provide a method for reducing power consumption in a USB Device. The system 50 may be particularly useful in battery powered applications. The system 50 may implement a low power USB device that have a low peak current consumption (e.g., 5 mA or less).

Figure 3A:
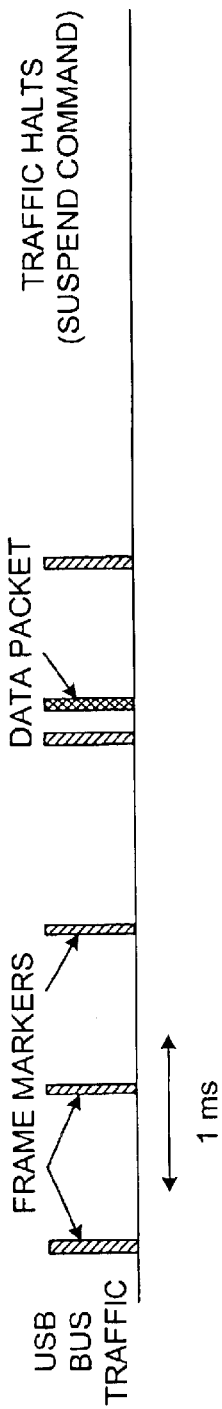
FIGS. 3a–3c are timing diagrams of approaches for reducing power in USB devices.
Figure 3B:
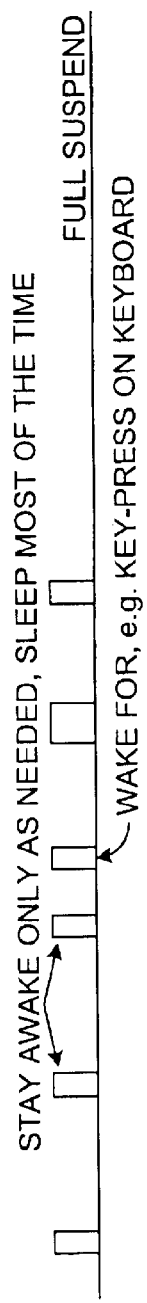
Figure 3C:
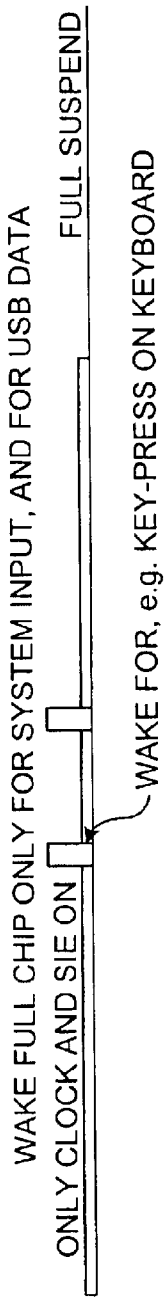

Referring to FIGS. 3a–3c, implementations are shown that utilize suspend modes in order to lower overall average power consumption of a USB device. FIG. 3a shows typical USB bus traffic. FIG. 3b illustrates the use of suspend mode during periods of normal traffic. The device wakes up on all bus activity, including frame marker events. In some cases the device may remain awake in anticipation of data packets, so that clock circuits are operating properly at the beginning of the received data. FIG. 3c illustrates the use of a partial suspend mode. The USB microcontroller 100 may allow the clock generator circuit 106 and the SIE 110 to remain on, allowing the clock to be available at the beginning of data packets. The remainder of the circuitry is left in a low-power suspended state until needed. The approaches shown in FIGS. 3a–c reduce power consumption compared to conventional architectures.

Figure 4:
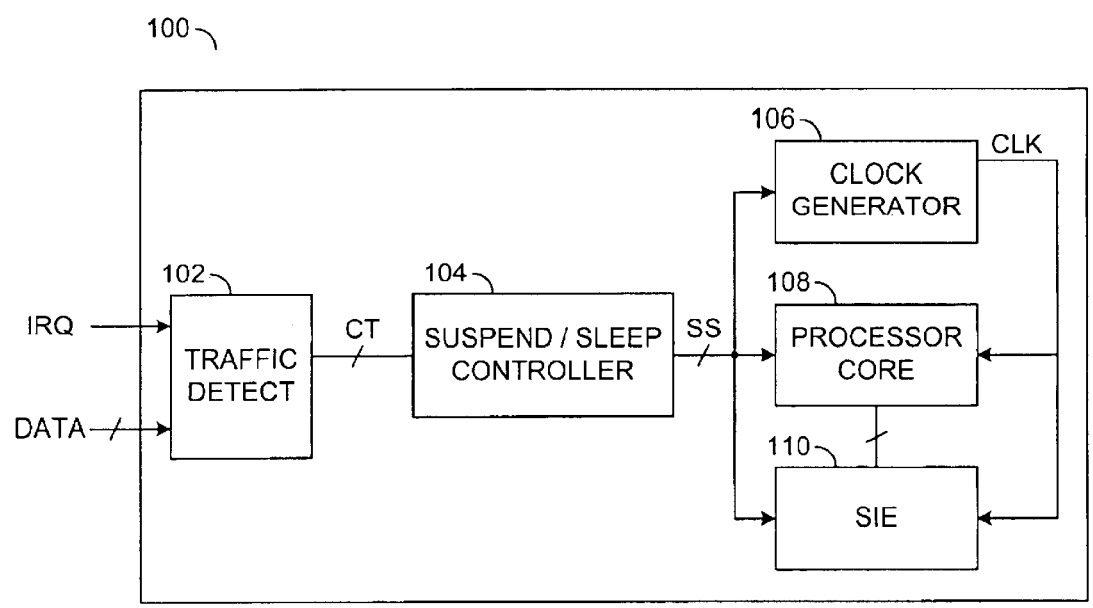
FIG. 4 is a block diagram of a preferred embodiment of the present invention.

Referring to FIG. 4, a diagram of a circuit 100 illustrating an implementation of the present invention is shown. The circuit 100 may be implemented as a USB microcontroller. The circuit 100 generally comprises a circuit 102, a circuit 104, a circuit 106, a circuit 108 and a circuit 110. The circuit 102 may be implemented as a traffic detect circuit. The circuit 104 may be implemented as a suspend/sleep controller circuit. The circuit 106 may be implemented as a clock generator circuit. The circuit 108 may be implemented as a processor core circuit. The circuit 110 may be implemented as a USB serial interface engine (SIE). USB devices normally contain a serial interface engine to process incoming and outgoing USB data.

The circuit 104 may generate a control signal (e.g., SS) that may be used to control the sleep/suspend state of the circuits 106, 108 and 110, in response to a control signal (e.g., CT) received from the traffic detect circuit 102. The traffic detect circuit 102 may generate the signal CT in response to data (or a non-idle state) received on a signal (e.g., DATA). The traffic detect circuit 102 may also receive a signal (e.g., IRQ). The signal IRQ may indicate an interrupt (e.g., a key press on a keyboard, etc.). The clock generator 106 may generate a signal (e.g., CLK) that may be used to clock the circuit 100. The signal CLK is generally presented to the processor 108 and the SIE 110.

Alternatively, the clock generator 106 may generate a number of clock pulses for the various circuits of the system 100. The clock pulses may have the same or different frequency and/or phase. Alternatively, an external USB SIE (not shown) may be implemented to interface with the microcontroller 100. However, implementing an external USB SIE may have reduced integration, with associated higher costs and power consumption.

The clock signal CLK may remain off until a USB packet arrives. The clock signal CLK may require a fast start-up time. The clock signal CLK may be required to be ready by an end of a packet synchronization field (to be discussed in connection with FIGS. 5–7). The circuit 100 may receive the synchronization field partly asynchronously. The system 100 may remain in the suspend mode during keep alive indications for low speed USB applications. The keep alive indicators may be implemented as packets, marker signals, or other appropriate type indications in order to meet the requirements of a particular implementation. The system 100 may process the keep alive markers with minimal power, only waking on relevant data. However, the circuit 100 may also wake up for all received packets. The system 100 may be configured to optimize possible power savings. The system 100 may be implemented for all To USB type devices. Additionally, the system 100 may be implemented for UART applications or other appropriate type implementations.

The circuit 100 may provide an architecture for optimizing low power consumption for USB devices. Specifically, the circuit 100 may be implemented for very low power applications, such as battery-powered devices. The circuit 100 may optimize the SIE 110 to allow for proper processing of USB data while minimizing power consumption. The circuit 100 may maximize the time spent in suspend mode (e.g., with no circuitry running, such as the clock generator 106).

A battery powered device may typically have a current consumption of 1 mA. Since USB microcontrollers typically consume 10 mA or more, spending considerable time in suspend mode allows such devices to have average currents that may meet targets for low power applications. The circuit 100 may significantly reduce power, by remaining suspended for a maximum possible time.

The present invention may allow the circuit 100, including the SIE 110 to remain completely off until a data packet arrives. However, the circuit 100 may wake and operate for any other device specific environmental changes, such as pressing a key on a keyboard, returning to suspend mode whenever possible.

Figure 5:
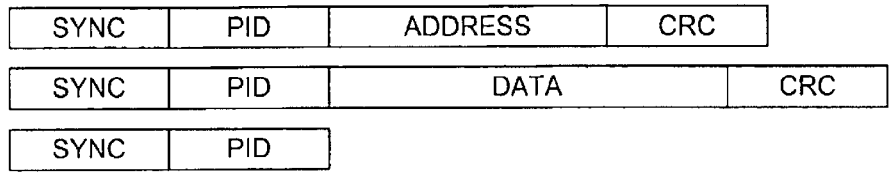
FIG. 5 is a block diagram illustrating a packet of data implemented in connection with the present invention.

Referring to FIG. 5, a set of typical USB packets is shown. USB traffic includes data packets that contain a preamble synchronization field (e.g., SYNC) followed by the packet information, such as Packet ID, addresses, data, CRC, etc.

Figure 6:
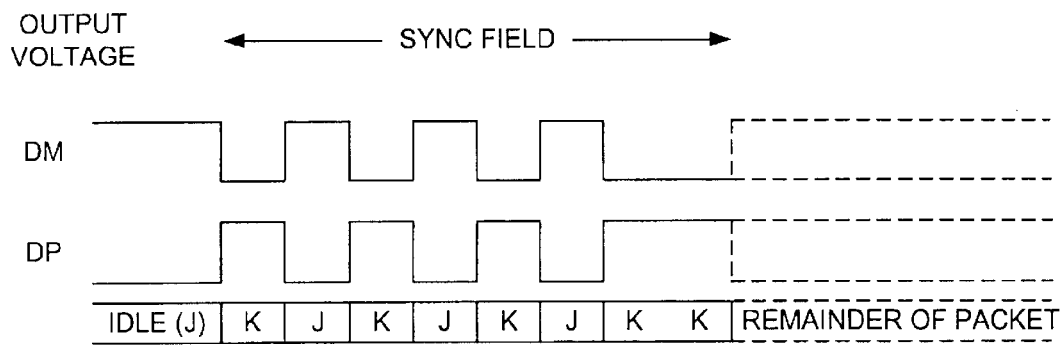
FIG. 6 is a timing diagram illustrating an operation of the present invention.

Referring to FIG. 6, a detailed diagram of the SYNC field is shown. The SYNC field, includes a KJKJKJKK data pattern, where 'J' is the idle state (DP low, DM high, in low-speed), and 'K' is the active state (DM low, DP high, in low-speed). In low-speed USB mode, the keep alive frame markers may indicate that the USB bus is active such that conventional devices do not go into suspend mode. The keep alive marker may be a simple single low pulse on the DM data line, while the DP line is held low.

Figure 7:
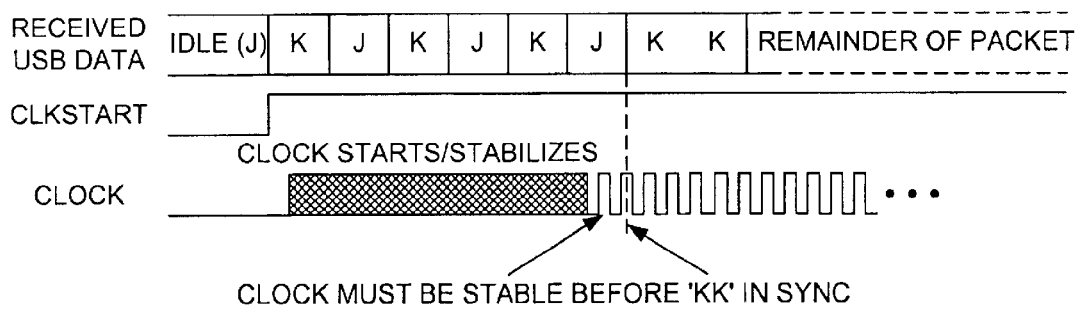
FIG. 7 is a timing diagram illustrating an operation of the present invention.

Referring to FIG. 7, a clock stabilization process of the circuit 100 is shown. The clock circuit 106 may be required to wake up and stabilize rapidly. The clock signal CLK may be required to be stabilized before the end of the packet SYNC field. Thus, the clock generation circuit 106 may be a fast starting, precision clock circuit.

Until the clock CLK is stable and accurate, the SIE 110 may receive the SYNC field asynchronously. During the time when the bit timing cannot be verified, the existence of a proper number of edges in the SYNC field may be verified. Once the clock signal CLK is accurate, the SIE 110 may implement the clock signal CLK to receive the remainder of the packet. As long as the clock signal CLK is available before the long bit (e.g., kk) at the end of the synchronization is received, the packet may be received properly. However, the precise point in the packet when the clock must be valid may vary with the particular SIE design, although a proper clock will generally be required sometime during the synchronization field.

The circuit 100 may maximize the time spent in suspend mode. The circuit 100 may not wake up until a USB packet begins to arrive (e.g., by recognizing the USB 'K' state at the beginning of the packet.) The circuit 100 may return to suspend mode immediately after the end of the packet, the 'kk' state or if no further action is required from the device (e.g., if the packet is not addressed to the device).

For low-speed USB application, a keep alive marker is sent at least once during every 1 ms frame. Processing the keep alive packets in the low-speed USB mode increases unnecessary power consumption. For a constantly-suspending device, the keep alive markers carry no additional information (e.g., the keep alive stops the device from suspending). Therefore, it may be desirable to optionally ignore the keep alive to spend as little power as possible on processing such events. The keep alive may be distinguished from the beginning of a normal USB data packet. Thus, the keep alive may be ignored to avoid initiating the power-up sequence.

Figure 8:
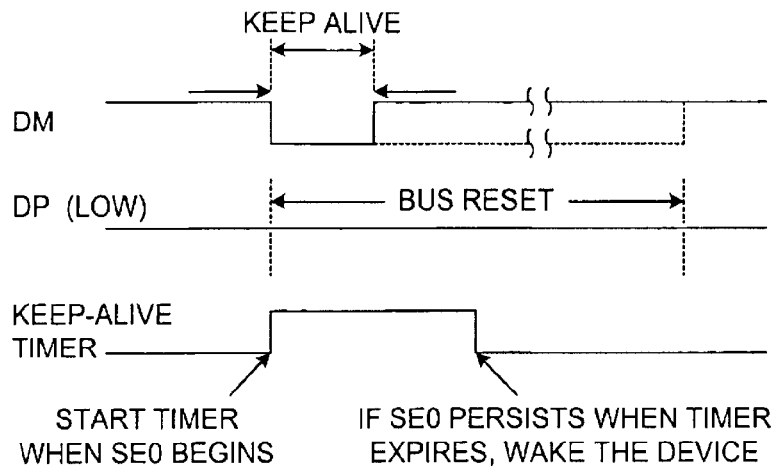
FIG. 8 is a timing diagram illustrating an operation of the present invention.

Referring to FIG. 8, an example keep alive signal is shown. The keep alive signal generally comprises two data lines (e.g., DM and DP). The signals DM and DP may be low for approximately 2 low-speed bit times (nominally 1.33 microseconds). A bus-reset signal also forces the signals DM and DP low, but for a longer time (at least 10 ms). When both the signals DM and DP are low, a single-ended zero (SE0) state occurs. To minimize power, a device may ignore keep alive signals (remaining in a suspend state). However, the device may awake on a bus reset to take appropriate reset actions.

To distinguish the keep alive from data packets or a bus reset, the device may be configured to awake if either (i) the USB 'K' state occurs (e.g., start of a data packet) or (ii) a SE0 occurs. The SEQ may be distinguished from a keep alive with an internal timer such as a one-shot type circuit, configured to it provide a time reference longer than a keep alive, but shorter than a bus reset. The timer could be made with low-power techniques and without a need for an accurate clock, since the timing requirements are not critical. Such a timer may be implemented on a typical integrated circuit as part of the fabrication of the circuit 100.

Figure 9:
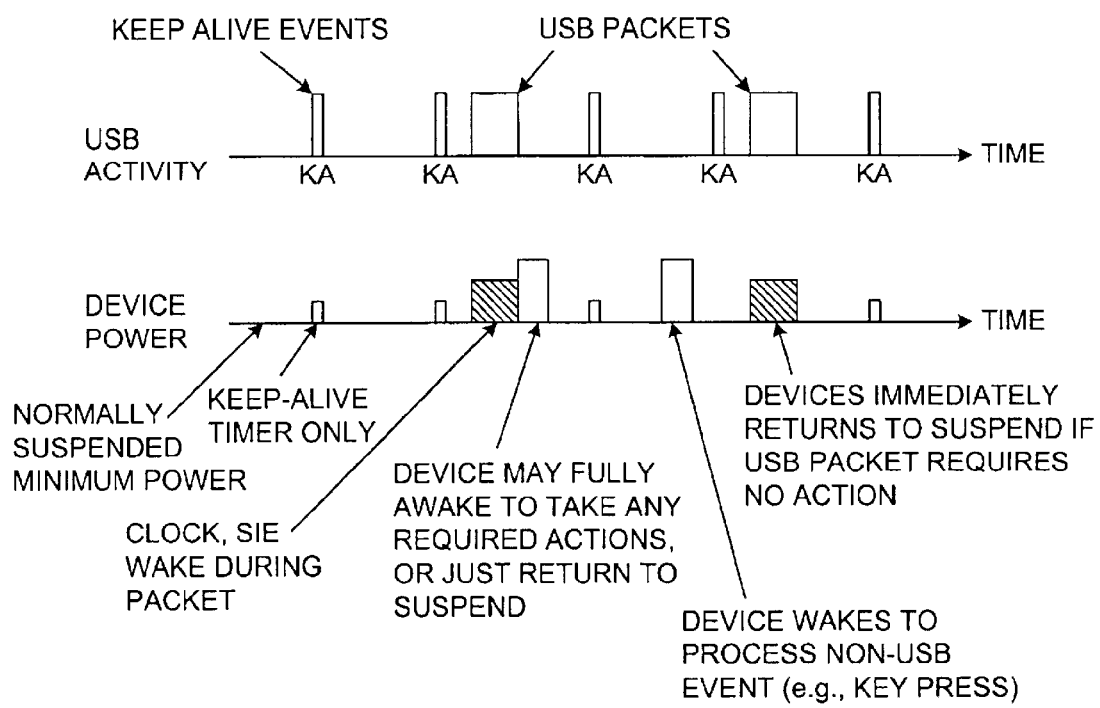
FIG. 9 is a timing diagram illustrating an operation of the present invention.

Referring to FIG. 9, an overall power usage for the device 100 is shown. The device 100 is typically placed in suspend mode when no activity is present. A small amount of power may be consumed to process keep alive packets (via the traffic detect circuit 102). However, during other USB packets, the clock generator 106 and the SIE 110 may wake and process the packet accordingly. The device 100 may remain awake to process the packet, then return to suspend mode. The particular circuits of the chip required to remain awake may vary with application. Additionally, the device 100 may wake for non-USB activity, such as pressing a key of a keyboard. The circuit 100 may optionally wake the remainder of the chip only if a received packet requires action from the device (e.g., only when the packet is addressed to the specific device).

The circuit 100 generally remains in a suspend mode until the beginning of a USB packet. The circuit 100 may also receive the synchronization field both partly asynchronously (no clock available) and partly synchronously (with a stable clock) to verify a valid packet has been received. The circuit 100 may immediately return to suspend mode after packets that require no further action have been processed. The circuit 100 may remain in suspend during a low-speed USB keep alive state, while waking for data packets or bus reset events.

The circuit 100 may allow a given USB device to achieve essentially the minimum possible power consumption by maximizing the time spent in suspend mode. The circuit 100 may be implemented for battery powered applications. The circuit 100 may lower power consumption in USB devices by remaining suspended until data packets are received. For example, the circuit 100 may reduce power in a low-speed USB device by remaining suspended during keep alive packets. The circuit 100 may remain in suspend mode until the beginning of a USB packet. The circuit 100 may provide a mechanism for remaining in suspend during a low-speed USB keep alive, while waking for data packets or bus reset events.

While the invention has been particularly shown and described with reference to the preferred embodiments thereof, it will be understood by those skilled in the art that various changes in form and details may be made without departing from the spirit and scope of the invention.

What is claimed is:

1. A method for reducing power consumption in a device, comprising the steps of:
   (A) remaining in a suspend mode until one or more packets are received;
   (B) receiving a synchronization field of each of said packets partially asynchronously and partially synchronously;
   (C) determining whether each of said one or more packets is a valid packet based on the received synchronization field;
   (D) suspending, waking, or partially waking said device in response to step (C); and
   (E) returning to said suspend mode after processing each packet.

2. The method according to claim 1, further comprising the step of:
   optionally ignoring a particular type of said packet when processing is not needed by said device.

3. The method according to claim 1, wherein step (D) further comprises:
   waking in response to a data type packet.

4. The method according to claim 1, wherein step (D) further comprises:
   remaining suspended in response to a keep alive type packet.

5. The method according to claim 1, wherein step (D) further comprises:
   determining an address of said particular type of packet.

6. The method according to claim 1, wherein step (D) further comprises:
   waking a clock generation circuit and a serial interface engine circuit in response to a particular type of packet.

7. The method according to claim 6, wherein step (D) further comprises:
   waking a microcontroller to process said particular type of packet.

8. The method according to claim 1, wherein step (D) further comprises:
   waking and then returning to said suspend mode.

9. The method according to claim 1, wherein step (D) further comprises:
   returning to a suspend state if no further action is needed.

10. The method according to claim 1, wherein step (D) further comprises:
    partially waking to process a keep alive packet.

11. The method according to claim 1, wherein said device comprises a Universal Serial Bus device.

12. An apparatus comprising:
    means for remaining in a suspend mode until one or more packets are received;
    means for receiving a synchronization field of each of said packets partially asynchronously and partially synchronously;
    means for determining whether each of said one or more packets is a valid packet based on the received synchronization field;
    means for suspending, waking, or partially waking said device in response to said determining means; and
    means for returning to said suspend mode after processing each packet.

13. An apparatus comprising:
    a device configured to (i) receive a synchronization field of one or more packets partially asynchronously and partially synchronously, (ii) determine whether each of said packets is a valid packet based on the received synchronization field, (iii) suspend, wake, or partially wake in response to said packet validity determination, and (iv) enter a suspend mode after processing each packet.

14. The apparatus according to claim 13, wherein said device is further configured to ignore a particular type of packet.

15. The apparatus according to claim 14, wherein said device is further configured to determine an address of said particular type of packet.

16. The apparatus according to claim 13, wherein said device is further configured to wake in response to a data type packet.

17. The apparatus according to claim 13, wherein said device is further configured to remain suspended in response to a keep alive type packet.

18. The apparatus according to claim 13, wherein said apparatus further comprises:

a keep alive and traffic detect circuit;

a clock generation circuit; and a serial interface engine, wherein said keep alive and traffic detect circuit is configured to process a particular type of packet and said device is configured to enable or disable said clock generation circuit and said serial interface engine in response to said particular type of packet.

19. The apparatus according to claim 13, wherein said device is further configured to wake and then return to said suspend mode.

20. The apparatus according to claim 13, wherein said device is further configured to return to said suspend mode if no further action is needed.

21. The apparatus according to claim 13, wherein said device is further configured to partially wake to process a keep alive packet.

22. The apparatus according to claim 13, wherein said device comprises a Universal Serial Bus device.

\* \* \* \* \*